US012674547B2

(12) United States Patent
Kim et al.

(10) Patent No.: US 12,674,547 B2
(45) Date of Patent: Jul. 7, 2026

(54) HIGH PRESSURE GAS CHARGING SYSTEM AND HIGH PRESSURE GAS CHARGING METHOD USING THE SAME

(71) Applicant: KOREA INSTITUTE OF MACHINERY & MATERIALS, Daejeon (KR)

(72) Inventors: Dae-Hwan Kim, Daejeon (KR); Gyubaek Cho, Daejeon (KR); Seung-Hoon Bae, Gimhae-si (KR); Tae Kook Park, Sejong (KR); Dae Won Cho, Busan (KR); Sunmin Kim, Daejeon (KR); Jae-Hyung Kim, Daejeon (KR); Sang Hyuk Lee, Sejong (KR); Sang Kyo Kim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 146 days.

(21) Appl. No.: 18/574,500

(22) PCT Filed: Jul. 22, 2022

(86) PCT No.: PCT/KR2022/010839

§ 371 (c)(1),
(2) Date: Dec. 27, 2023

(87) PCT Pub. No.: WO2023/008848

PCT Pub. Date: Feb. 2, 2023

(65) Prior Publication Data

US 2024/0288124 A1 Aug. 29, 2024

(30) Foreign Application Priority Data

Jul. 26, 2021 (KR) ........................ 10-2021-0097846
Jun. 29, 2022 (KR) ........................ 10-2022-0079784

(51) Int. Cl.
*F17C 5/06* (2006.01)

(52) U.S. Cl.
CPC .......... *F17C 5/06* (2013.01); *F17C 2221/012* (2013.01); *F17C 2223/0123* (2013.01);
(Continued)

(58) Field of Classification Search
CPC .................. F17C 5/06; F17C 2221/012; F17C 2223/0123; F17C 2223/036;
(Continued)

(56) References Cited

U.S. PATENT DOCUMENTS 5,454,408 A * 10/1995 DiBella ................ F04B 9/1176 141/47
6,182,717 B1 2/2001 Yamashita
(Continued)

FOREIGN PATENT DOCUMENTS

JP 2002-228098 A 8/2002
JP 2003-65497 A 3/2003
(Continued)

OTHER PUBLICATIONS

International Search Report issued on Oct. 31, 2022, for corresponding International Patent Application No. PCT/KR2022/010839, along with an English translation (4 pages).
(Continued)

*Primary Examiner* — Kenneth Rinehart
*Assistant Examiner* — Stephanie A Shrieves
(74) *Attorney, Agent, or Firm* — Hauptman Ham, LLP

(57) ABSTRACT

In a high pressure gas charging system and method, the system includes a charging container, a fluid supply part and a high pressure charging part. A high pressure gas is charged in the charging container. The fluid supply part is connected to a first side of the charging container, and is configured to supply incompressible fluid into the charging container before charging the high pressure gas. The high pressure charging part is connected to a second side of the charging container, and is configured to charge the high pressure gas into the charging container in which the incompressible fluid is already supplied. The incompressible fluid is supplied to the charging container until an inner pressure of the charging
(Continued)

container reaches a predetermined pressure, and the incompressible fluid is removed to outside through the fluid supply part as the high pressure gas is charged into the charging container.

16 Claims, 12 Drawing Sheets

(52) U.S. Cl.
CPC .. *F17C 2223/036* (2013.01); *F17C 2250/043* (2013.01); *F17C 2250/0439* (2013.01)

(58) Field of Classification Search
CPC ........ F17C 2250/043; F17C 2250/0439; F17C 5/00; F17C 13/02; F17C 3/04; Y02E 60/32
USPC ............................................................ 141/18
See application file for complete search history.

(56) References Cited

U.S. PATENT DOCUMENTS

| | | | | |
|---|---|---|---|---|
| 9,074,729 | B2 * | 7/2015 | De Jongste | F17C 5/06 |
| 10,883,663 | B2 * | 1/2021 | Karam | F17C 13/04 |
| 2007/0181211 | A1 * | 8/2007 | Klebe | F17C 13/021 141/82 |
| 2007/0258828 | A1 * | 11/2007 | Adler | F04F 1/10 417/46 |
| 2009/0010717 | A1 * | 1/2009 | Horton, III | F17C 5/06 405/210 |
| 2009/0294470 | A1 * | 12/2009 | Lampe | F17C 5/02 222/395 |
| 2011/0048576 | A1 * | 3/2011 | Meisner | F17C 13/00 141/82 |
| 2011/0127174 | A1 * | 6/2011 | Heinrich | B82Y 30/00 29/428 |
| 2012/0298256 | A1 * | 11/2012 | Mori | F17C 13/02 141/94 |

FOREIGN PATENT DOCUMENTS

| | | | |
|---|---|---|---|
| JP | 2003-314792 | A | 11/2003 |
| JP | 2006-161889 | A | 6/2006 |
| JP | 2008-514844 | A | 5/2008 |
| KR | 10-2011-0099759 | A | 9/2011 |
| KR | 10-1272589 | B1 | 6/2013 |

OTHER PUBLICATIONS

Written Opinion issued on Oct. 31, 2022, for corresponding International Patent Application No. PCT/KR2022/010839 (4 pages).

* cited by examiner

HIGH PRESSURE GAS CHARGING SYSTEM AND HIGH PRESSURE GAS CHARGING METHOD USING THE SAME

CROSS-REFERENCE TO RELATED APPLICATION

The present application is a national stage filing under 35 U.S.C. § 371 of PCT application number PCT/KR2022/010839 filed on Jul. 22, 2022, which is based upon and claims the benefit of priorities to Korean Patent Application No. 10-2021-0097846 filed on Jul. 26, 2021, and Korean Patent Application No. 10-2022-0079784 filed on Jun. 29, 2022, in the Korean Intellectual Property Office, which are incorporated herein in their entireties by reference.

TECHNICAL FIELD

The present disclosure of invention relates to a high pressure gas charging system and a high pressure gas charging method using the charging system, and more specifically the present disclosure of invention relates to a high pressure gas charging system and a high pressure gas charging method using the charging system, capable of omitting a separate cooling device by preventing a temperature increase due to compression of a high pressure gas inside of a charging container during a high pressure gas charging process, and capable of stabilizing high pressure gas charging and improving charging speed with minimizing separate facilities, when the high pressure gas such as hydrogen is charged into the charging container.

RELATED TECHNOLOGY

Recently, as demand for hydrogen vehicles increases and supply expands, the installation and supply of hydrogen charging centers to supply hydrogen to hydrogen vehicles is expanding.

In these hydrogen charging centers, hydrogen is pre-charged in a charging container, and the hydrogen in the charged container is provided to a hydrogen vehicle. To achieve this, it is necessary to pre-charge hydrogen into the charging container and then recharge it into the charging container of the hydrogen vehicle.

In the conventional process of charging hydrogen into the charging container, as illustrated in FIG. 1, a hydrogen charging line 3 is connected to the charging container 2 and then the hydrogen is charged. However, the process of charging the hydrogen into the charging container 2, the hydrogen is compressed inside the charging container 2 and heat is generated. The generated heat increases the charging time and has a negative impact on the durability of the charging container 2.

To solve the problem, technology is being applied to cool hydrogen to about −40° C. when charging hydrogen, but an internal temperature of the charging container 2 may not be completely prevented from rising to a temperature that may affect the durability of the charging container 2.

Thus, conventionally, when charging hydrogen in the charging container of the hydrogen vehicle, a separate cooling device should to be installed to cool the heat generated during the hydrogen charging process, as disclosed in Korean Patent No. 10-1272589. By cooling the charging container through this cooling device, the increase in charging time during the hydrogen charging process may be minimized.

However, by providing such an additional cooling device, problems such as complicating the design of the overall charging system or increasing the size of the entire system occurred. In addition, there was a problem that the temperature inside the charging container still increased due to the inability to fundamentally block the heat generated during the hydrogen charging process.

Related prior art is Korean Patent No. 10-1272589.

DETAILED DESCRIPTION

Technical Problems

The present invention is developed to solve the above-mentioned problems of the related arts. The present invention provides a high pressure gas charging system, capable of omitting a separate cooling device by preventing a temperature increase due to compression of a high pressure gas inside of a charging container during a high pressure gas charging process, and capable of stabilizing high pressure gas charging and improving charging speed with minimizing separate facilities, when the high pressure gas such as hydrogen is charged into the charging container.

In addition, the present invention also provides a high pressure gas charging method using the charging system.

Method for Solving Problems

According to an example embodiment, the high pressure gas charging system includes a charging container, a fluid supply part and a high pressure charging part. A high pressure gas is charged in the charging container. The fluid supply part is connected to a first side of the charging container, and is configured to supply incompressible fluid into the charging container before charging the high pressure gas. The high pressure charging part is connected to a second side of the charging container, and is configured to charge the high pressure gas into the charging container in which the incompressible fluid is already supplied. The incompressible fluid is supplied to the charging container until an inner pressure of the charging container reaches a predetermined pressure, and the incompressible fluid is removed to outside through the fluid supply part as the high pressure gas is charged into the charging container.

In an example, a pressure of the high pressure gas charged into the charging container and a pressure of the incompressible fluid remaining in the charging container may maintain the predetermined pressure, as the high pressure gas is charged into the charging container.

In an example, a temperature of the incompressible fluid in the charging container may be same as or less than that of the high pressure gas charged into the charging container.

In an example, the fluid supply part may include an outer supply line through which the incompressible fluid is received from outside, and an inner supply line connected to the outer supply line and extending toward a lower space of the charging container. An end portion of the inner supply line may extend to make contact with a lower portion of the charging container or extend towards a lower portion of the charging container.

In an example, the charging container may be inclined with respect to a ground by a predetermined angle, and the inner supply line may extend towards the lower portion of the inclined charging container.

In an example, the high pressure gas charging part may include an outer charging line through which the high pressure gas is received from outside, and an upper supply line connected to the outer charging line and extends toward an upper space of the charging container.

In an example, the high pressure gas charging part may supply the high pressure gas charged in the charging container to outside by controlling a valve. The high pressure gas charging part may include a fluid separator configured to remove the incompressible fluid included in the high pressure gas.

According to another example embodiment, in a high pressure gas charging method, incompressible fluid is supplied into a charging container through a fluid supply part connected to a first side of the charging container. Whether or not a pressure of the charging container reaches a predetermined pressure is decided. A high pressure gas is charged into the charging container through a high pressure gas charging part connected to a second side of the charging container when the pressure of the charging container reaches the predetermined pressure, and the incompressible fluid is removed to outside through the fluid supply part as the high pressure gas is charged into the charging container. The high pressure gas is charged and the incompressible fluid is removed until the high pressure gas is fully charged into the charging container.

In an example, in the charging the high pressure gas and removing the incompressible fluid, a pressure of the high pressure gas charged in the charging container and a pressure of the incompressible fluid remaining in the charging container may maintain the predetermined pressure.

According to still another example embodiment, a high pressure gas charging system includes a gas supply container, a fluid storage container and a charging container. The gas supply container is configured to store a high pressure gas. The fluid storage container is connected to the gas supply container and is configured to store incompressible fluid. The charging container is connected to each of an upper portion and a lower portion of the fluid storage container, and the high pressure gas is charged into the charging container. The incompressible fluid stored in the fluid storage container is supplied to the charging container as the high pressure gas stored in the gas supply container is supplied to the fluid storage container. The high pressure gas in the fluid storage container is charged into the charging container as the incompressible fluid supplied to the charging container is supplied to the fluid storage container again.

In an example, the charging container may be positioned higher than the fluid storage container.

In an example, the incompressible fluid in the charging container may be supplied to the fluid storage container again due to a hydrostatic pressure generated by gravity.

In an example, a temperature of the high pressure gas supplied to the fluid storage container and a temperature of the incompressible fluid supplied to the fluid storage container may maintain a predetermined temperature.

In an example, the high pressure gas charging system may further include a first pipe connected between the gas supply container and the fluid storage container, and having a first valve, a second pipe connected between an upper portion of the fluid storage container and the charging container, and having a second valve, and a third pipe connected between a lower portion of the fluid storage container and the charging container, and having a third valve.

In an example, with the first valve and the third valve open (ON) and the second valve closed (OFF), the high pressure gas stored in the gas supply container may be supplied to the fluid storage container through the first pipe, and the incompressible fluid stored in the fluid storage container may be supplied to the charging container through the third pipe.

In an example, with the first valve closed (OFF) and the second valve and the third valve open (ON), the incompressible fluid supplied to the charging container may be supplied to the fluid storage container through the third pipe again, and the high pressure gas in the fluid storage container may be charged into the charging container through the second pipe.

In an example, the charging container in which the high pressure gas is charged may be built in an external mobility, may be detached and equipped in the external mobility, or may be connected to a charging terminal extended from the external mobility.

According to still another example embodiment, in a high pressure gas charging method, a high pressure gas is injected to a fluid storage container from a gas supply container. Incompressible fluid stored in the fluid storage container is supplied to a charging container, as the high pressure gas is injected to the fluid storage container. The incompressible fluid is supplied to the fluid storage container from the charging container again, when the high pressure gas is fully injected to the fluid storage container. The high pressure gas injected to the fluid storage container is charged to the charging container, as the incompressible fluid is supplied to the fluid storage container.

In an example, in the supplying the incompressible fluid to the fluid storage container again, the incompressible fluid in the charging container may be supplied to the fluid storage container due to a hydrostatic pressure generated by gravity.

In an example, in the injecting the high pressure gas to the fluid storage container, a first valve connected between the gas supply container and the fluid storage container may be open and a pressure of the high pressure gas may be increased by a compressor, and then the high pressure gas stored in the gas supply container may be supplied to the fluid storage container.

In the supplying the incompressible fluid stored in the fluid storage container to the charging container, a second valve connected between an upper portion of the fluid storage container and an upper portion of the charging container may be closed and a third valve connected between a lower portion of the fluid storage container and a lower portion of the charging container may be open, and then the incompressible fluid may be supplied to the charging container due to a pressure generated by the high pressure gas toward the fluid storage container.

In the supplying the incompressible fluid to the fluid storage container again and charging the high pressure gas to the charging container, the first valve may be closed and the second valve may be open, and then the incompressible fluid may be filled to the fluid storage container from a lower portion of the charging container through a lower portion of the fluid storage container, and thus the high pressure gas may be charged to the charging container from an upper portion of the fluid storage container through an upper portion of the charging container.

IMPACT OF THE INVENTION

According to the present example embodiments, the incompressible fluid is proactively provided to the charging container, and then when a pressure of the remaining space of the charging container is maintained to be a predetermined pressure suitable for charging the high pressure gas, the high pressure gas starts to be charged in the charging container. Further, since the incompressible fluid charged in the charging container is removed to outside with charging the high pressure gas, an inner pressure of the charging container is maintained with the predetermined pressure in charging the high pressure gas.

In addition, the inner pressure of the charging container is uniformly maintained until the high pressure gas is fully charged and the incompressible fluid is sufficiently removed to outside.

Accordingly, the inner pressure of the charging container is maintained to be the predetermined pressure suitable for charging the high pressure gas, and thus the compression of the high pressure gas does not occur during charging the high pressure gas and a separate high pressure gas cooling device for preventing an increase of temperature inside of the charging container may be omitted.

Here, the pressure of the charging container is not changed, the temperature of the charged high pressure gas is maintained to be a required temperature. In addition, the temperature of the incompressible fluid is maintained to be same as or less than that of the high pressure gas, and thus separate cooling device or temperature controller for cooling or controlling the temperature of the high pressure gas is needless and the temperature of the charging container may be maintained relatively lower.

Further, decreasing the temperatures of the high pressure gas and the incompressible fluid may also decrease the supplying pressure of the high pressure gas.

Here, when the incompressible fluid is selected not to affect durability of the device using the high pressure gas, the remaining incompressible fluid supplied to a mobility using the high pressure gas as a fuel does not cause any problem or trouble to the mobility, even though the incompressible fluid remains with the high pressure gas in the charging container. Thus, there is no design difficulty in completely removing the incompressible fluid.

In addition, the fluid separator is equipped to prevent the incompressible fluid from being mixed, and thus the problem caused due to the mixture between the incompressible fluid and the high pressure gas may be prevented.

In addition, in charging the high pressure gas to the charging container, the pressure of the high pressure gas is increased by the compressor and then the high pressure gas is only supplied to the fluid storage container in which the incompressible fluid is stored, so that a separate incompressible fluid supply device may be omitted and the charging may be easily and simply performed.

Here, through merely the pip configuration of the high pressure gas charging system and ON/OFF control of the valve, the separate incompressible fluid supply device may be omitted and the incompressible fluid may be easily injected to and removed from the charging container, and thus hydrogen gas as the high pressure gas may be effectively charged to the charging container.

When charging the high pressure gas into the charging container directly, the temperature of the charging container is increased due to the heat generated during the charging. However, the incompressible fluid is previously supplied to the charging container and then the high pressure gas is charged with removing the incompressible fluid, and then the heat generated in the charging container during the charging may be minimized and more effective and stable charging of the high pressure gas may be performed.

Here, the incompressible fluid is removed to outside by the hydrostatic pressure generated by gravity, without using a separate pressurizing device, and thus stable charging and improved charging speed may be achieved while minimizing separate equipment.

Figure 1:
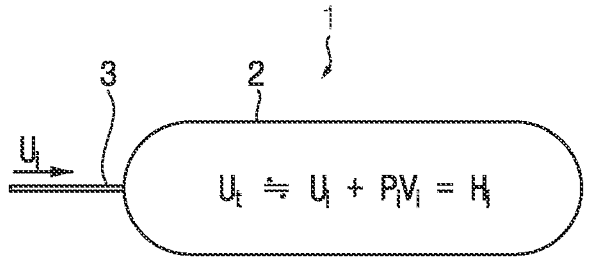
FIG. 1 is a schematic view illustrating a conventional high pressure gas charging system.

| * Reference numerals |
|---|
| 10, 20, 30, 40: high pressure gas charging system |
| 100, 1400: charging container |
| 101: lower space |
| 102: upper space |
| 200: sensor part |
| 300, 301, 302: fluid supplying part |
| 305: incompressible fluid |
| 320, 330, 340: inner supply line |
| 321, 331: end portion |
| 400: high pressure gas charging part |
| 405: high pressure gas |
| 420: inner charging line |
| 500: fluid separator |
| 1100: compressor |
| 1200: gas supply container |
| 1300: fluid storage container |
| 1500: pipe |
| 1510: first pipe |
| 1511: first valve |
| 1520: second pipe |
| 1521: second valve |
| 1530: third pipe |
| 1531: third valve |

BEST EMBODIMENTS FOR THE IMPLEMENTATION OF THE INVENTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention is described more fully hereinafter with reference to the accompanying drawings, in which embodiments of the invention are shown.

FIG. 1 is a schematic view illustrating a conventional high pressure gas charging system.

Referring to FIG. 1, in the conventional high pressure gas charging system 1, a high pressure gas charging line 3 is connected to a first side of a charging container 2 in which the high pressure gas is charged, and the high pressure gas is supplied to the charging container 2 through the high pressure gas charging line 3.

Here, the high pressure gas may be hydrogen. This may be the same in the below example embodiments of the present invention.

In the high pressure gas charging system 1, even though a temperature of the high pressure gas, for example, a temperature of hydrogen is supplied with cooling to −40° C., the temperature of the high pressure gas is increased to more than 80° C. inside of the charging container 2. This temperature rise may reach a temperature that is limited for stable operation of the charging container 2.

Thus, a separate cooling device is required to cool the temperature of the charging container 2, but when the charging container is cooled by the cooling device, the high pressure gas is not charged to the charging container in the cooling. Thus, the high pressure gas charging time increases.

As illustrated in FIG. 1, as the high pressure gas having an inner energy $U_i$ is charged into the charging container 2, an inner energy $U_t$ inside of the charging container 2 may be changed as Equation (1).

$$U_t \simeq U_i + P_i V_i = H_i \quad \text{Equation (1)}$$

As described in Equation (1), it may be said that enthalpy Hi of the high pressure gas charging line 3 as the high pressure gas is supplied through the high pressure gas charging line 3 is the same as the internal energy $U_t$ of the charging container 2 after the high pressure gas is charged. In addition, during the process, in addition to the internal energy $U_i$, the high pressure gas receives a certain work ($P_iV_i$, here, $P_i$ is a supply pressure of the high pressure gas and $V_i$ is a volume of the charging container) from an external high pressure supply device in charging process.

Accordingly, in charging the high pressure gas, the work $P_iV_i$ supplied to the high pressure gas is changed to the heat, and then the temperature of the charging container 2 is increased due to the heat.

Thus, in the example embodiments of the present invention below, the high pressure gas charging system is designed so that the work required in the high pressure gas charging process is not converted into the heat, so that the temperature inside of the charging container does not rise. This will be described in detail with reference to the following drawings.

Figure 2:
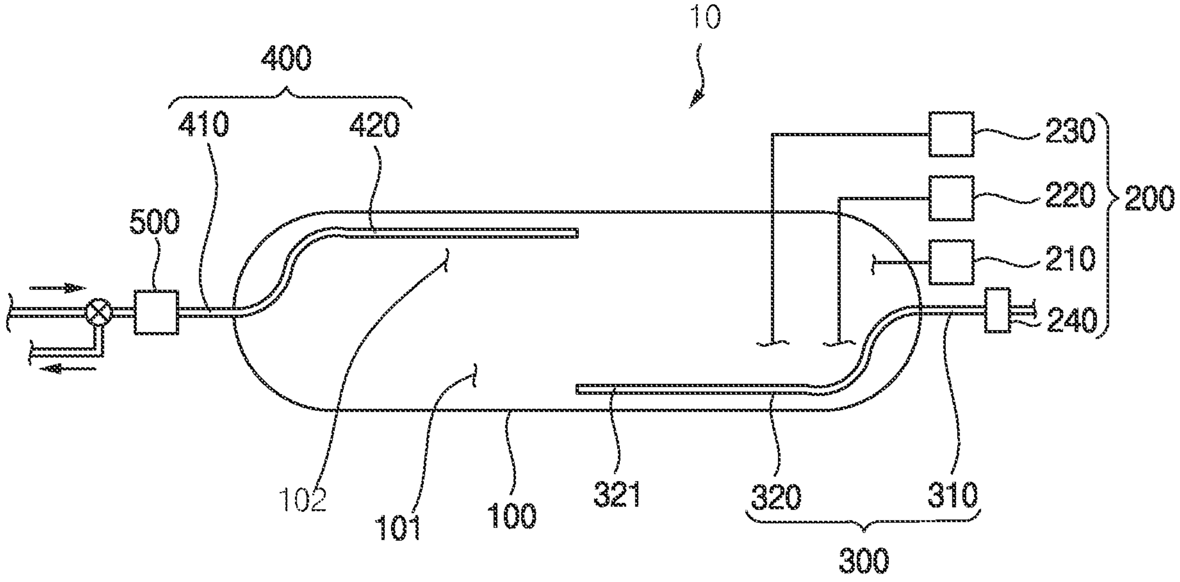
FIG. 2 is a schematic view illustrating a high pressure gas charging system according to an example embodiment of the present invention.

FIG. 2 is a schematic view illustrating a high pressure gas charging system according to an example embodiment of the present invention.

Referring to FIG. 2, the high pressure gas charging system 10 (hereinafter, the charging system) includes a charging container 100, a sensor part 200, a fluid supply part 300 and a high pressure gas charging part 400.

The charging container 100 is a storage container in which the high pressure gas explained below is charged or a charging container installed in high pressure gas mobility, and the charging container 100 may have various kinds of shapes or structures with a predetermined volume.

The fluid supply part 300 is connected to a first side of the charging container 100, and supplies incompressible fluid to the charging container 100 or removes the incompressible fluid to outside from the charging container 100.

Here, the incompressible fluid is a fluid whose density rarely changes even when pressure or flow rate changes. As a representative incompressible fluid, water, which does not significantly affect the performance of a hydrogen fuel cell, may be used.

The fluid supply part 300 includes an outer supply line 310 and an inner supply line 320. The outer supply line 310 is connected to a separate incompressible fluid storage part (not shown) and delivers the incompressible fluid to the charging container 100.

The inner supply line 320 extends from the outer supply line 310, and then extends toward an inner space of the charging container 100, which is a lower space 101 of the charging container 100. The incompressible fluid delivered by the outer supply line 310 is supplied to the lower space 101 along the inner supply line 320.

Here, when the incompressible fluid stored in the charging container 100 is removed to outside, the incompressible fluid firstly moves through the inner supply line 320 and then the incompressible fluid is removed through the outer supply line 310.

In the present example embodiment, an end portion 321 of the inner supply line 320, as illustrated in figure, may be extended to make contact with a lower portion or a lower surface of the charging container 100. Thus, in removing the incompressible fluid, the incompressible fluid remaining in the charging container 100 may be completely removed.

The high pressure gas charging part 400 is connected to a second side of the charging container 110, and supplies the high pressure gas to the charging container 100 to charge the high pressure gas inside of the charging container 100.

Here, the high pressure gas charging part 400 may be connected to various kinds of positions of the charging container 110.

The high pressure gas charging part 400 includes an outer charging line 410 and an inner charging line 420. The outer charging line 410 is connected to an external separate high pressure gas storage part (not shown), and delivers the high pressure gas to the charging container 100.

The inner charging line 420 extends from the outer charging line 410 and extends toward the inside of the charging container 100 which is an upper space 102. The high pressure gas delivered by the outer charging line 410 is supplied to the upper space 102 through the inner charging line 420.

In addition, the inner charging line 420 may extend parallel with an upper surface of the charging container 110 like the inner supply line 320, and an extending direction of the inner charging line 420 may be variously changed with extending toward the upper space 102.

In the present example embodiment, the incompressible fluid is previously filled in the lower pace 101 of the charging container 100, and thus the inner supply line 320 is extended into the charging container 100 close to the lower surface of the charging container 100. Alternatively, the high pressure gas is supplied to the upper space of the charging container 100, after the incompressible fluid is partially charged to the charging container 100, and thus the inner supply line 420 is extended into the charging container 100 close to the upper surface of the charging container 100.

The senor part 200 measures a state of the charging container 100, a state of supply of the incompressible fluid, or a state of charging of the high pressure gas, and may include a temperature sensor 210, a level sensor 220, a pressure sensor 230 and a flow sensor 240.

The temperature sensor 210 measures an inner temperature of the charging container 100. The temperature of the incompressible fluid charged in the charging container 100 may be measured, and the temperature of the high pressure gas charged in the charging container 100 may also be measured. Here, each of the temperatures of the incompressible fluid and the high pressure gas may be individually measured.

In the present example embodiment, as explained below, in charging the high pressure gas into the charging container 100, the temperature of the high pressure gas is uniformly maintained. Thus, the temperature of the incompressible fluid is maintained to be same as that of the high pressure gas and then the temperature of the high pressure gas is uniformly maintained, or the temperature of the incompressible fluid is maintained to be lower than that of the high pressure gas and then the temperature of the high pressure gas may be decreased.

Thus, using the temperature sensor 210, the temperatures of the incompressible fluid and the high pressure gas are measured and then the temperature of the high pressure gas may be monitored.

In the conventional technology, the high pressure gas is compressed to be −40° C. and then is supplied, but in the present example embodiment, since the temperature of the high pressure gas is not increased, the high pressure gas having the temperature of about 30° C. or a room temperature may be supplied. Thus, the incompressible fluid having the temperature of about 30° C. or a room temperature may be supplied too.

Here, the high pressure gas may be maintained with a relatively lower temperature, and thus the incompressible fluid may also be maintained with a relatively lower temperature. When the temperature of the high pressure gas is lower than the room temperature, there is an advantage in that the same mass of high pressure gas may be supplied to the charging container 100 even though the high pressure gas is charged at a lower supply pressure.

However, since the incompressible fluid is, for example, water, it is necessary to set the temperature of the high pressure gas to be within a temperature range at which the water may maintain a liquid state in charging the high pressure gas.

The level sensor 220 measures a level of the incompressible fluid filled in the charging container 100. Thus, a flux of the fluid filled in the charging container 100 may be measured, and then the supply of the fluid may be controlled to that the level of the incompressible fluid does not increase to the level where the internal charging line 420 is located. In addition, the lever sensor 220 may measure whether the high pressure gas is completely charged in the charging container 100 and the incompressible fluid is sufficiently removed.

Here, the flow sensor 240 may measure the same as the level sensor 220. The flow sensor 240 may be equipped to the fluid supply part 300, and then may measure the flux of the incompressible fluid flowing through the fluid supply part 300.

Thus, the information on the quantity of the fluid supplied into the charging container 100 may be obtained, and the information of the quantity of the fluid removed from the charging container 100 to outside may be also obtained. Then, the quantity of the incompressible fluid remaining in the charging container 100 may be obtained.

Accordingly, the flow sensor 240 may obtain the same results as the level sensor 220, and at least one of the flow sensor 240 and the level sensor 220 may be equipped.

The pressure sensor 230 measures the pressure of inside of the charging container 100. As the incompressible fluid is supplied to the charging container 100, the pressure of the space except for the incompressible fluid, which is the space in which the high pressure gas is charged, may be measured.

Thus, whether the pressure of the space for the high pressure gas reaches the predetermined pressure is measured, and then the proper time for charging the high pressure gas into the charging container 100 may be decided.

Generally, at the initial state in which the incompressible fluid is not supplied to the charging container 100, the pressure of the charging container 100 may be about 5 bar. However, the pressure of the charging container 100 should be maintained to be about 700 bar, for the high pressure gas to be charged into the charging container 100.

Thus, the incompressible fluid is supplied to the charging container 100 to increase the pressure of the charging container 100, and thus the pressure of the charging container 100 is forced to reach the predetermined pressure at which the high pressure gas starts to be charged.

Then, using the pressure sensor 230, the pressure of the inside of the charging container 100 is measured according to the supply of the incompressible fluid, and thus whether the incompressible fluid is supplied or not may be decided. Then, the starting time of the charging of the high pressure gas to the charging container 100 may be decided.

As illustrated in FIG. 2, the high pressure gas charging part 400 charges the high pressure gas into the charging container 100, as explained above, and selectively opens an outlet line via a three-way valve to supply the high pressure gas charged in the charging container 100 to outside.

As the operation of the three-way valve, the high pressure gas may be charged into the charging container 100 with opening the charging line, and the high pressure gas charged in the charging container 100 may be supplied to outside with opening the outlet line.

Inside of the charging container 100, the high pressure gas is charged with removing the incompressible fluid to outside, and some of the incompressible fluid may remain in the inside of the charging container 100 after the charging of the high pressure gas is finished.

Thus, when the high pressure gas is supplied to outside via the high pressure gas charging part 400, the incompressible fluid may be mixed with the high pressure gas. Thus, a fluid separator 500 may be equipped at the high pressure charging part 400.

Then, the fluid separator 500 may remove the incompressible fluid when the incompressible fluid is mixed with the high pressure gas supplied to outside, and the high pressure gas with high purity may be supplied to outside.

Alternatively, although not shown in the figure, the high pressure gas charging part 400 merely charges the high pressure gas, and a separate high pressure gas outlet line is connected to the charging container 100, and then the outlet of the high pressure gas is performed via the high pressure gas outlet line. Here, the fluid separator 500 may be equipped at the separate high pressure gas outlie line.

Generally, when water is used as the incompressible fluid, since water is not particularly soluble in hydrogen, water and hydrogen are hardly mixed with each other inside of the charging container 100 in the process of charging the high pressure gas and removing the incompressible fluid. Further, in a fuel cell using hydrogen as an energy source, since the final byproduct generated through the fuel cell is water, the fuel cell is not damaged or malfunctioned even though water as the incompressible fluid and hydrogen mixed with each other are supplied to the fuel cell.

Thus, as in the present example embodiment, even though the incompressible fluid is removed as the high pressure gas is charged, with previously supplying the incompressible fluid to the charging container 100, the problem of mixing of the high pressure gas and the incompressible fluid may hardly occur.

Further, even though the high pressure gas and the incompressible fluid are mixed and then are supplied to outside, the incompressible fluid is firstly removed as much as possible by the fluid separator and then the pure high pressure gas may be supplied. In addition, even though some of the incompressible fluid is supplied with mixed with the high pressure gas, problems such as performance degradation or damage to the fuel cell may not occur, when selecting the incompressible fluid that does not affect the durability of the devices using the high pressure gas.

Figure 3:
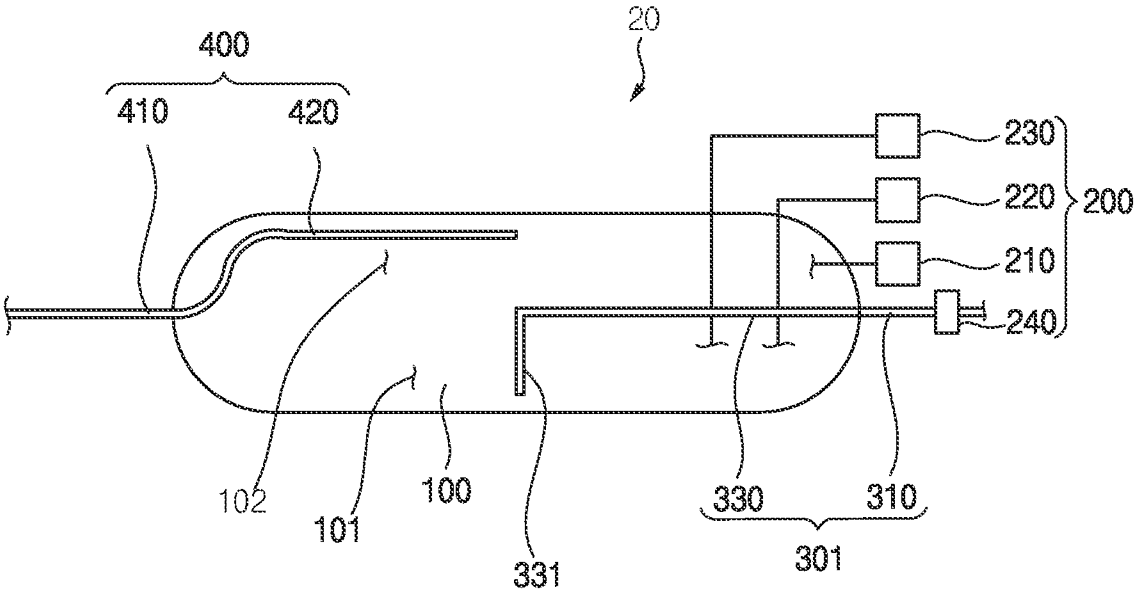
FIG. 3 is a schematic view illustrating a high pressure gas charging system according to another example embodiment of the present invention.

FIG. 3 is a schematic view illustrating a high pressure gas charging system according to another example embodiment of the present invention.

The charging system 20 according to the present example embodiment is substantially same as the charging system 10 of FIG. 2 except for an extending structure of an inner supply line 330 of a fluid supply part 301, and thus same reference numerals are used for the same elements and any repetitive explanation will be omitted.

Referring to FIG. 3, in the charging system 20 according to the present example embodiment, an end portion 331 of the inner supply line 330 of the fluid supply part 301 is extended heading for a lower portion or a lower surface of the charging container 100.

In the charging system 10 of FIG. 2, the end portion 321 of the inner supply line 320 extends to make contact with the lower surface of the charging container 100, and thus the incompressible fluid may be stably supplied to the charging container 100.

However, in removing the incompressible fluid from the charging container 100, especially in case that the level of the incompressible fluid removed is very low, the incompressible fluid is not sufficiently removed and may remain at the lower portion of the charging container 100 according the height of the end portion 321.

Thus, as illustrated in FIG. 3, the end portion 331 of the inner supply line 330 of the inner supply line 330 extends heading for the lower surface of the charging container 100, and then the amount of the incompressible fluid remaining in the lower portion of the charging container 100 may be minimized and the incompressible fluid may be removed more efficiently, when removing the incompressible fluid from the charging container 100.

Figure 4:
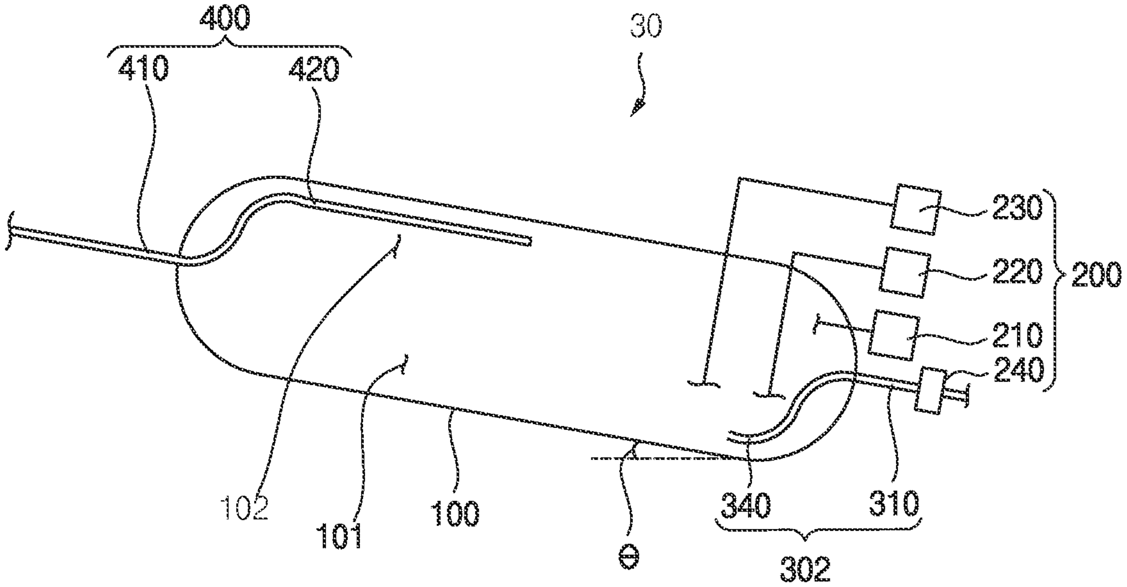
FIG. 4 is a schematic view illustrating a high pressure gas charging system according to still another example embodiment of the present invention.

FIG. 4 is a schematic view illustrating a high pressure gas charging system according to still another example embodiment of the present invention The charging system 30 according to the present example embodiment is substantially same as the charging system 10 of FIG. 2 except for an extending structure of an inner supply line 340 of a fluid supply part 302 and a posture of the charging container 100, and thus same reference numerals are used for the same elements and any repetitive explanation will be omitted.

Referring to FIG. 4, in the charging system 30 according to the present example embodiment, the charging container 100 is positioned with an inclination with a ground surface by a predetermined angle θ.

Accordingly, when the charging container 100 is positioned to be inclined with the ground surface, when removing the incompressible fluid from the charging container 100, especially in case that the level of the incompressible fluid removed is very low, the incompressible fluid may remain at a right side lower portion of the charging container 100 of FIG. 4.

Then, when the inner supply line 340 of the fluid supply part 302 extends heading for the right side lower portion of the charging container 100, the incompressible fluid of the charging container 100 may be effectively removed to outside while the length of the inner supply line 340 is relatively short.

Thus, finally, the amount of the incompressible fluid remaining in the charging container 100 may be minimized.

Further, although not shown in the figure, the posture of the charging container 100 is positioned to be inclined by a predetermined angle θ as illustrated in FIG. 4 only in case that the incompressible fluid is removed. Here, a separate variable driving structure (not shown) may be additionally equipped for changing the posture of the charging container 100.

Hereinafter, a high pressure gas charging method (hereinafter, the charging method) using the charging system 10 of FIG. 2 is explained below. In addition, each of a charging method using the charging system 20 of FIG. 3 and a charging method using the charging system 30 of FIG. 4 is substantially same as the charging method using the charging system 10 of FIG. 2, and thus any repetitive explanation will be omitted.

Figure 5:
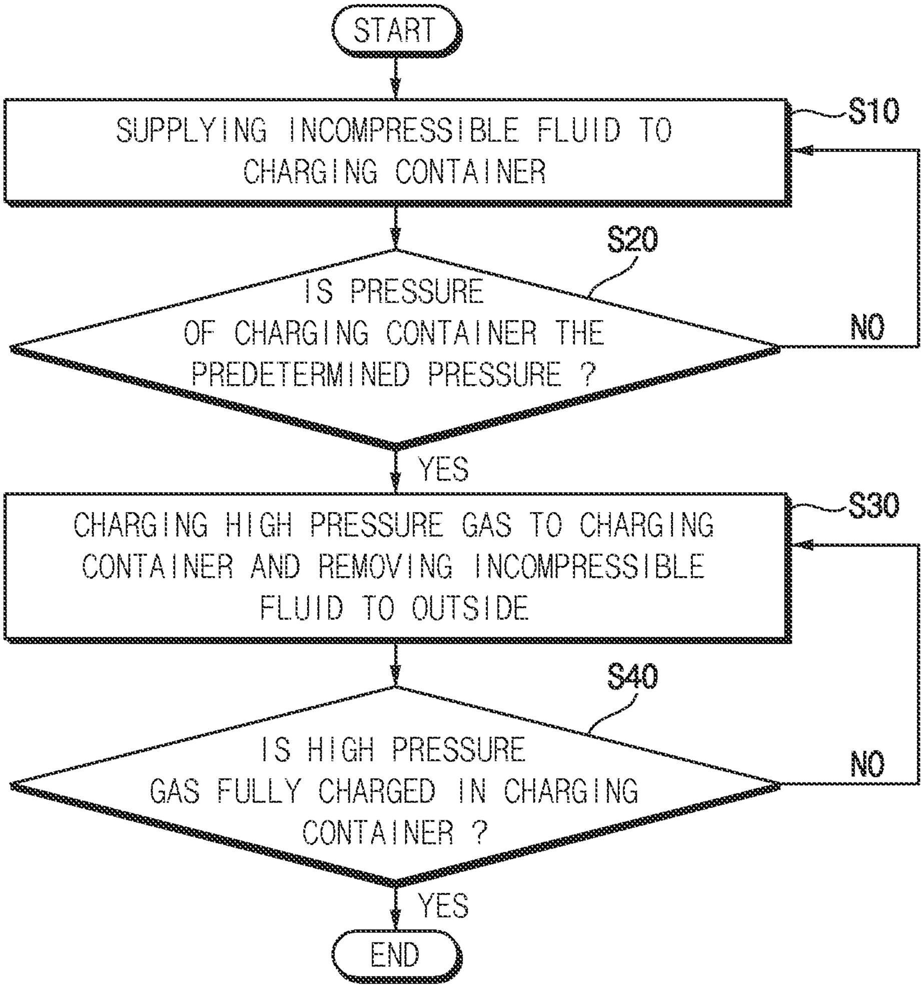
FIG. 5 is a flow chart illustrating a high pressure gas charging method using the high pressure gas charging system of FIG. 2.

FIG. 5 is a flow chart illustrating a high pressure gas charging method using the high pressure gas charging system of FIG. 2. FIG. 6A, FIG. 6B, FIG. 6C and FIG. 6D are schematic views illustrating states of the high pressure gas charging system in the high pressure gas charging method of FIG. 5.

Figure 6A:
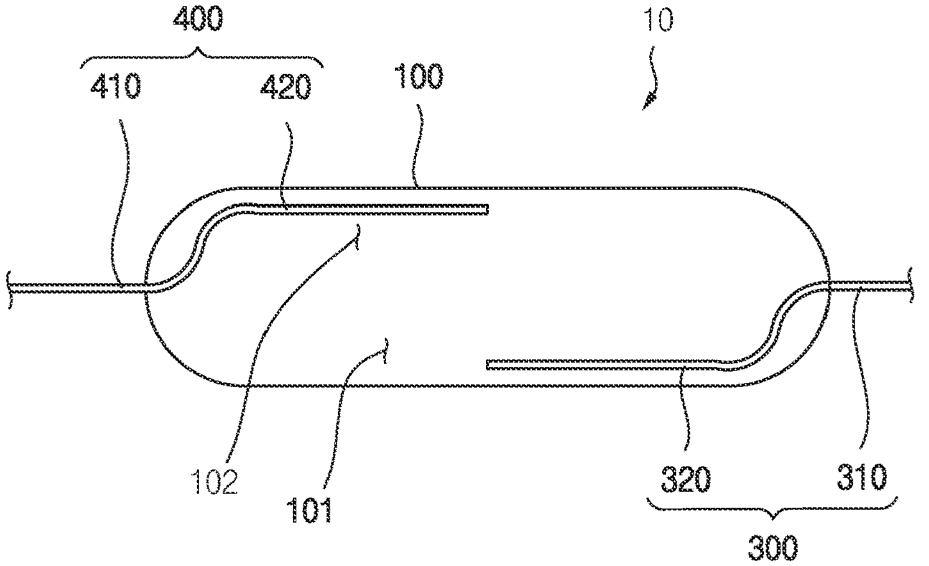
FIG. 6A, FIG. 6B, FIG. 6C and FIG. 6D are schematic views illustrating states of the high pressure gas charging system in the high pressure gas charging method of FIG. 5.

Firstly, referring to FIG. 5 and FIG. 6A, in the charging method, the incompressible fluid 305 is supplied to an inside of the charging container 100 via the fluid supply part 300 connected to a first side of the charging container 100 (step S10).

The incompressible fluid 305 supplied to the charging container 100 is supplied toward the lower space 101 of the charging container 100, and the level of the incompressible fluid 305 is increased in the lower space 101 of the charging container 100 and then the incompressible fluid 305 is filled.

Here, an inner pressure of the charging container 100 may be about 5 bar at the initial state, and the inner pressure $P_1$ of the charging container 100 increases as the incompressible fluid 305 is filled into the charging container 100.

Figure 6B:
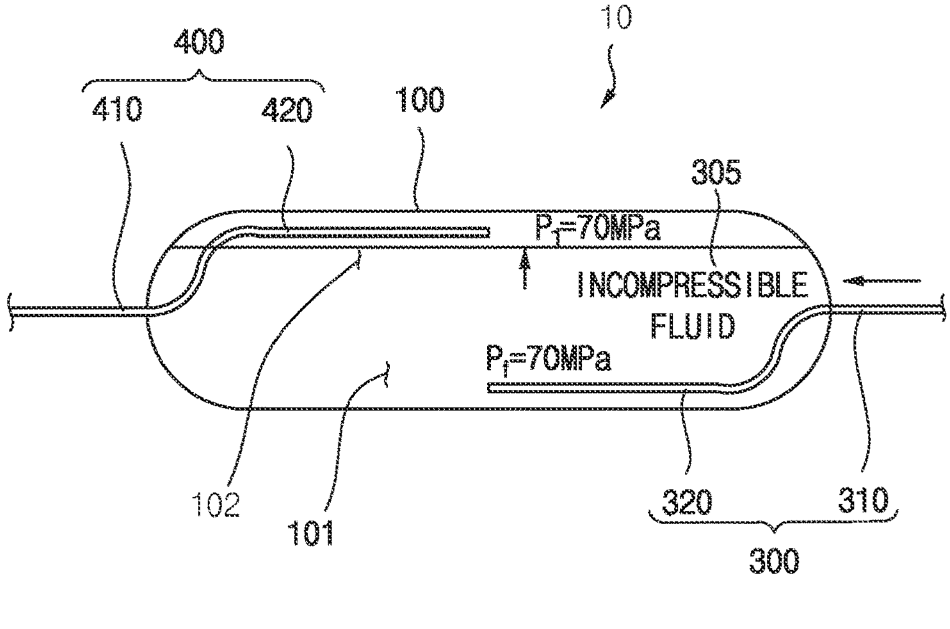

Then, referring to FIG. 5 and FIG. 6B, whether the inner pressure $P_1$ of the charging container 100 reaches a predetermined pressure, for example about 700 bar, or not is decided (step S20), and then the incompressible fluid 305 is filled into the charging container 100 until the inner pressure $P_1$ of the charging container 100 reaches the predetermined pressure.

As the incompressible fluid 305 is charged to the charging container 100, the level of the incompressible fluid increases and the inner pressure $P_1$ of the inner space of the charging container 100 which is the remaining space without the incompressible fluid increase. Then, finally, the supply of the incompressible fluid 305 is finished when the inner pressure $P_1$ of the charging container 100 reaches the predetermined pressure, for example about 700 bar.

In this process, the level or the amount of the incompressible fluid supplied to the charging container 100 is measured by the level sensor 220 or the flow sensor 240. Likewise, the pressure and the temperature of the charging container 100 are measured by the pressure sensor 230 and the temperature sensor 210, respectively.

When the inner pressure $P_1$ of the charging container 100 reaches the predetermined pressure, the pressure $P_f$ of the incompressible fluid charged in the charging container 100 may be maintained to be the predetermined pressure.

Figure 6C:
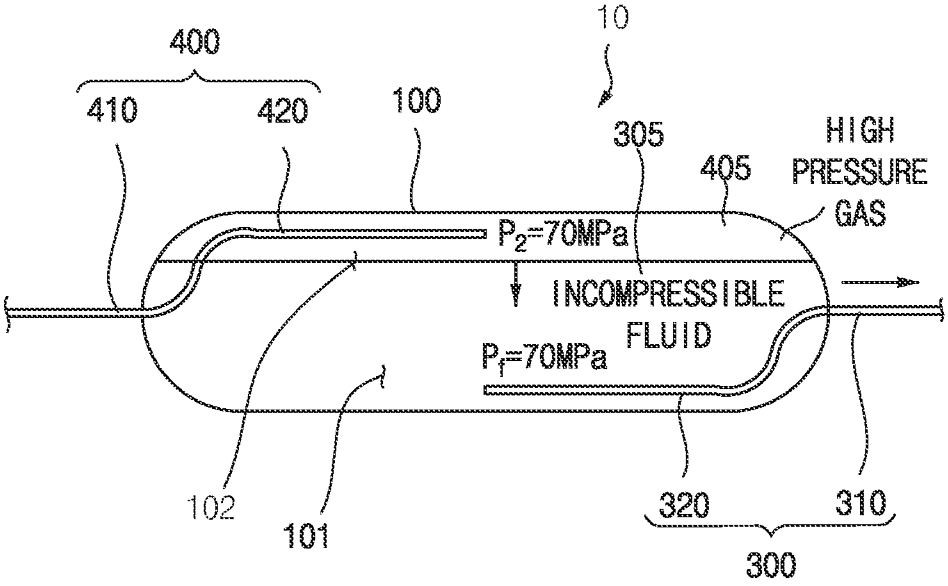

Then, referring to FIG. 5 and FIG. 6C, the high pressure gas 405 is charged into the charging container 100, via the high pressure gas charging part 400 connected to the charging container 100 (step S30).

Accordingly, as the high pressure gas 405 is charged into the charging container 100, the incompressible fluid 305 filled in the charging container 100 is removed to outside via the fluid supply part 300, and thus the level of the incompressible fluid 305 in the charging container 100 is decreased.

The fluid supply part 300 is maintained to be open, to remove the incompressible fluid 305 to outside as the high pressure gas 405 is charged. In addition, the fluid supply part 300 controls the flow of the fluid to remove the incompressible fluid 305 as much as the charging amount of the high pressure gas 405, with maintaining the pressure of the charging container 100.

As explained referring to FIG. 1, the high pressure gas 405 receives the certain wok $P_iV_i$ from the external high pressure gas supply device in the charging process to the charging container 100. In the present example embodiment, the received work $P_iV_i$ is transferred to the incompressible fluid 305, and then the incompressible fluid 305 is removed to outside.

In addition, when the incompressible fluid 305 is removed to outside through the outer supply line 310 of the fluid supply part 300, the incompressible fluid 305 has a relatively high pressure $P_i$, and then the work $P_iV_i$ transferred by the incompressible fluid 305 may be used by connecting the outer supply line 310 to a separate system.

Finally, unlike in FIG. 1, the problem that the work transferred to the incompressible fluid 305 remains inside of the charging container 100 and then is transformed to the heat does not occur in the charging process of the high pressure gas. In addition, the work is transferred to the removed incompressible fluid 305, and thus the problem that the work transferred to the incompressible fluid 305 remains as the heat energy in the charging container 100 does not occur.

Accordingly, in the present example embodiment, the heat energy of the charging container 100 is not increased due to the charging of the high pressure gas 405 and the temperature of the charging container 100 is not increased either, due to the heat energy.

Thus, in the charging process of the high pressure gas 405 into the charging container 100, the temperature of the high pressure gas 405 and the temperature of the incompressible fluid 305 are uniformly maintained, and the incompressible fluid 305 is merely removed to outside and the level of the incompressible fluid 305 is decreased.

In addition, in the charging process of the high pressure gas 405, the charging pressure $P_2$ of the high pressure gas inside of the charging container 100 is maintained to be the predetermined pressure, for example about 700 bar, and the pressure $P_f$ of the incompressible fluid 305 may be maintained the same.

Figure 6D:
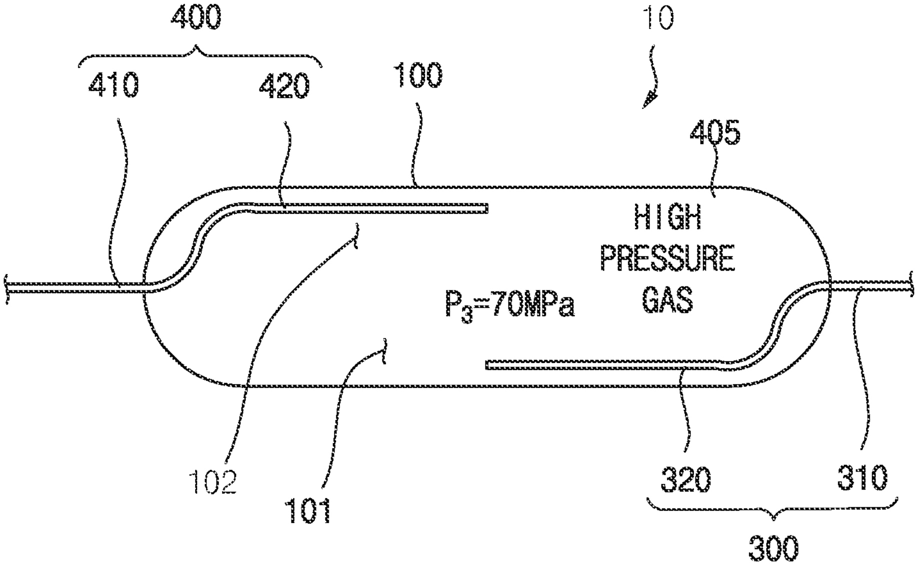

Then, referring to FIG. 5 and FIG. 6D, whether the high pressure gas 405 is completely charged inside of the charging container 100 or not is decided (step S40), and then, the high pressure gas 405 is continuously charged until the high pressure gas 405 is completely charged to the charging container 100 and the incompressible fluid 305 is sufficiently removed to outside.

Then, the high pressure gas 405 is fully charged in the upper space 102 and the lower space 101 of the charging container 100, and the incompressible fluid 305 is sufficiently removed to outside. Here, when the incompressible fluid 305 is sufficiently removed to outside, the fluid supply part 300 is closed and then the flow of the incompressible fluid 305 is blocked.

Here, the pressure $P_3$ of the high pressure gas 405 charged in the charging container 100 is substantially same as the predetermined pressure.

Some of the incompressible fluid 305 may remain inside of the charging container 100 and may be mixed with the high pressure gas supplied to outside, but this does not cause any problem, as explained above.

The, if necessary, the high pressure gas 405 charged in the charging container 100 may be supplied to a vehicle or a mobility which uses the high pressure gas as an energy source, through the high pressure gas charging part 400 with the operation of the valve, as explained above.

Figure 7:
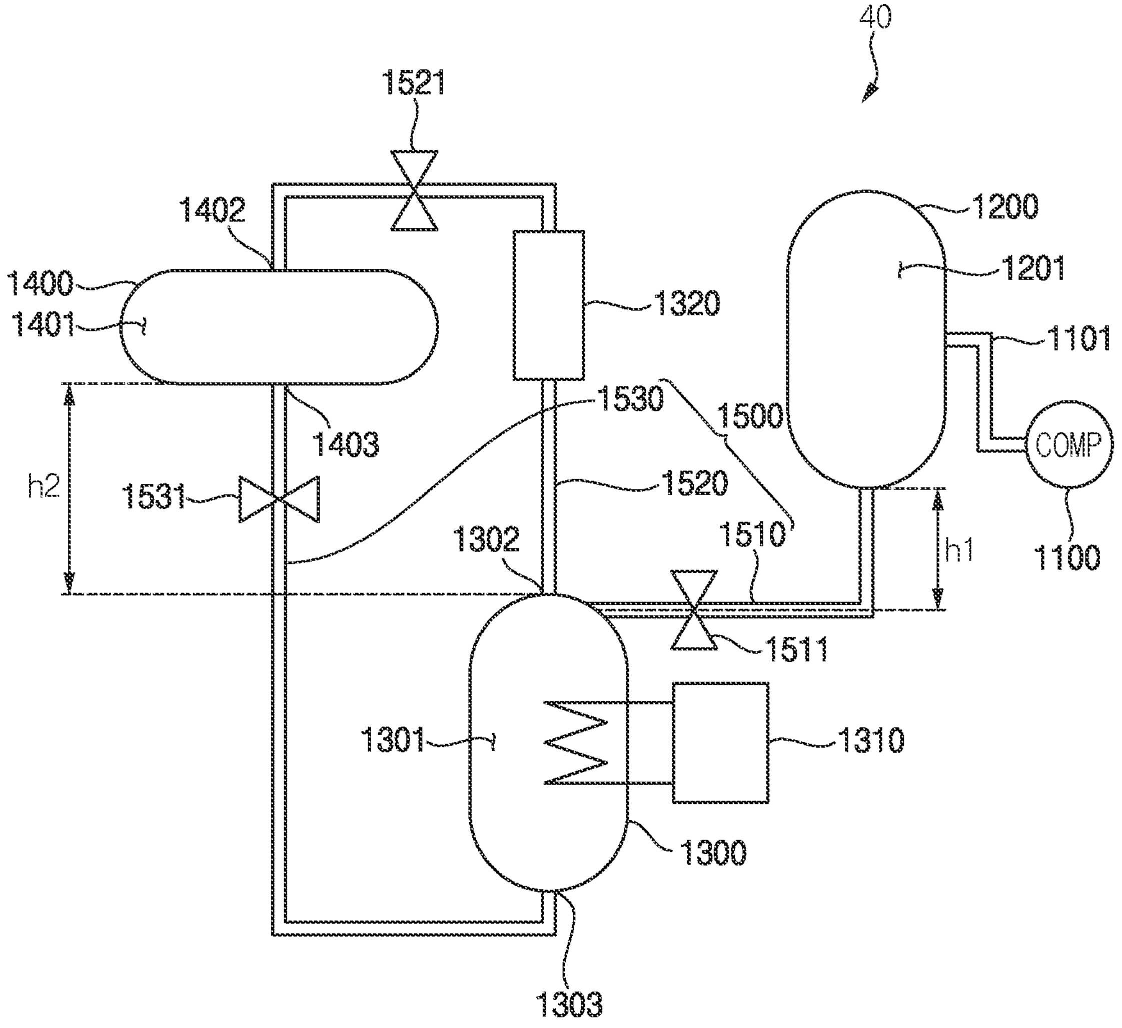
FIG. 7 is a schematic view illustrating a high pressure gas charging system according to still another example embodiment of the present invention.

FIG. 7 is a schematic view illustrating a high pressure gas charging system according to still another example embodiment of the present invention.

Referring to FIG. 7, the charging system 40 according to the present example embodiment includes a compressor 1100, a gas supply container 1200, a fluid storage container 1300, a charging container 1400 and a pipe 1500.

The pipe 1500 includes first to third pipes 1510, 1520 and 1530. First to third valves 1511, 1521 and 1531 are respectively installed to the first to third pipes 1510, 1520 and 1530, and control the opening (ON) or the closing (OFF) of the first to third pipes 1510, 1520 and 1530, respectively.

The compressor 1100 is connected to the gas supply container 1200 via a compressing line 1101, and compresses the high pressure gas 405 stored in the gas supply container 1200 to increase the pressure of the high pressure gas 405.

Thus, when the pressure of the high pressure gas 405 increases, the high pressure gas 405 stored in the gas supply container 1200 may be supplied to the fluid storage container 1300 by the high pressure.

The gas supply container 1200 may have a predetermined chamber shape, and a volume or a structure of the chamber may not be limited. At the initial state, the high pressure gas 405 is stored in an inner space 1201 of the gas supply container 1200.

Here, the high pressure gas 405 may be hydrogen, as explained above, but not limited thereto.

The gas supply container 1200 is connected to the fluid storage container 1300 via the first pipe 1510, and the flow of the high pressure gas 405 through the first pipe 1510 is controlled by the first valve 1511 installed at the first pipe 1510.

The first pipe 1510 is connected between a lower portion of the gas supply container 1200 and an upper portion of the fluid storage container 1300. The lower portion of the gas supply container 1200 is located higher than the upper portion of the fluid storage container 1300 by a first height h1.

Here, the high pressure gas 405 stored in the gas supply container 1200 may be supplied to the fluid storage container 1300 by itself due to the high pressure. In addition, a reflux may be prevented due to the height difference h1 between the gas supply container 1200 and the fluid storage container 1300.

Here, the height difference h1 between the gas supply container 1200 and the fluid storage container 1300 may not be necessary, and it is sufficient for the high pressure gas 405 to be efficiently supplied to the fluid storage container 1300 by the high pressure of the high pressure gas 405.

The fluid storage container 1300 may have a predetermined chamber shape like the gas supply container 1200, and a volume or a structure of the chamber may not be limited. At the initial state, the incompressible fluid 305 is stored in an inner space 1301 of the fluid storage container 1300, and here, the incompressible fluid 305 may be water, as explained above.

A first side of the fluid storage container 1300 is connected to the gas supply container 1200 via the first pipe 1510, and a second side of the fluid storage container 1300 is connected to the charging container 1400 via the second and third pipes 1520 and 1530.

Here, the first pipe 1510 may be connected to the upper portion of the fluid storage container 1300, as explained above.

A first end of the second pipe 1520 may also be connected to the upper portion 1302 of the fluid storage container 1300.

The upper portion 1302 of the fluid storage container 1300 is connected to the second pipe 1520, and a second end of the second pipe 1520 is connected to an upper portion of the charging container 1400.

A temperature control device 1310 such as a cooling device, a heating device or a heat exchanger, may be equipped inside of the fluid storage container 1300, to control the temperature of the incompressible fluid 305 and the high pressure gas 405.

As the high pressure gas 405 is injected to the fluid storage container 1300, the gas is compressed inside of the fluid storage container 1300 and then the temperature may be increased. However, the temperature control device 1310 may control the increase of the temperature.

In addition, A temperature control device 1320 such as a cooling device, a heating device or a heat exchanger, may be equipped at the second pipe 1520, to control the temperature of the high pressure gas 405 supplied to the charging container 1400 via the second pipe 1520.

In the figure, the second end of the second pipe 1520 is connected to the upper portion 1402 of the charging container 1400, but the connecting position of the second pipe 1520 may be variously changed.

Figure 10A:
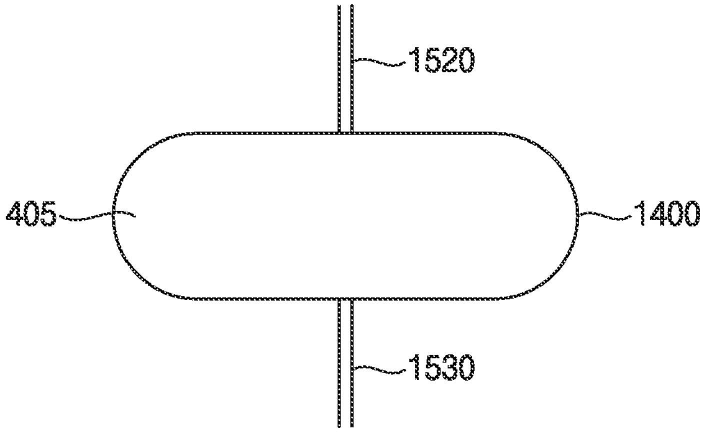
FIG. 10A is an example of a usage state of the high pressure gas in the charging container and FIG. 10B is another example of a usage state of the high pressure gas in the charging container, in the high pressure gas charging method of FIG. 8.
Figure 10B:
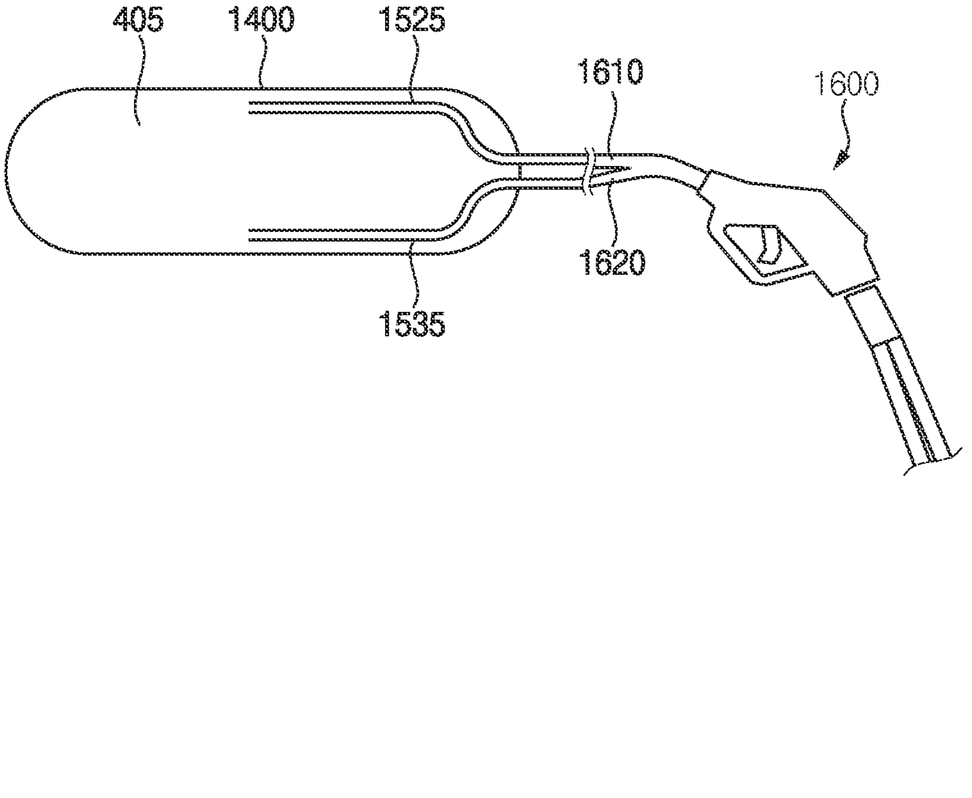

For example, as illustrated in FIG. 10A and FIG. 10B below, the charging container 1400 may be directly used for the charging container of the mobility, and thus the charging container 1400 may have various shapes. Thus, the connecting position of the second pipe 1520 may be variously changed considering the shape pf the charging container 1400.

In addition, the lower portion 1303 of the fluid storage container is connected to a first end of the third pipe 1530, and a second end of the third pipe 1530 is connected to the lower portion 1403 of the charging container 1400.

Likewise, in the figure, the second end of the third pipe 1530 is connected to the lower portion 1403 of the charging container 1400, but the connecting positon of the third pipe 1530 may be variously changed considering the shape of the charging container 1400, as explained above.

Accordingly, the shape or the structure of the charging container 1400 may be changed variously, and thus the position of the connection of the third pipe 1530 may be variously changed considering the shape or the structure of the charging container 1400.

For example, as illustrated in FIG. 10B below, the second and third pipes 1520 and 1530 may be connected to a side of the charging container 1400.

Here, the second and third valves 1521 and 1531 are respectively equipped at the second and third pipes 1520 and 1530, and then the opening ON or the closing OFF between the fluid storage container 1300 and the charging container 1400 may be controlled.

As explained above, the upper portion 1402 of the charging container 1400 is connected to the upper portion 1302 of the fluid storage container 1300 via the second pipe 1520, and the lower portion 1403 of the charging container 1400 is connected to the lower portion 1303 of the fluid storage container 1300 via the third pipe 1530.

At the initial state, the incompressible fluid 305 is not charged into the charging container 1400, and the high pressure gas 405 is not charged into the charging container 1400 or some of the high pressure gas 405 remains in the charging container 1400, and then the pressure of the charging container 1400 is lower than the proper charging pressure.

In addition, the charging container 1400 may have a certain chamber shape, and a volume or a structure of the chamber may be not limited.

The lower portion of the charging container 1400 is positioned higher than the upper portion of the fluid storage container 1300 by a second height h2. Thus, as explained below, the incompressible fluid 305 stored in the charging container 1400 is supplied to the fluid storage container 1300 by a hydrostatic pressure generated by gravity.

Here, the second height h2 may be changed variously.

Although not shown in the figure, the charging container 1400 may be detached from the charging system 40, after the high pressure gas 405 is completely charged to the charging container 1400.

Then, the charging container 1400 charged with the high pressure gas 405 may be directly installed to the mobility (not shown), or may be connected to a separate unit configured to supply the high pressure gas to the mobility.

Further, when the high pressure gas charged in the charging container 1400 is fully used by the mobility, the charging container 1400 is connected to the charging system 40 again and the high pressure gas is charged to the charging container 1400 again.

Hereinafter, the charging method using the charging system 40 is explained in detail.

Figure 8:
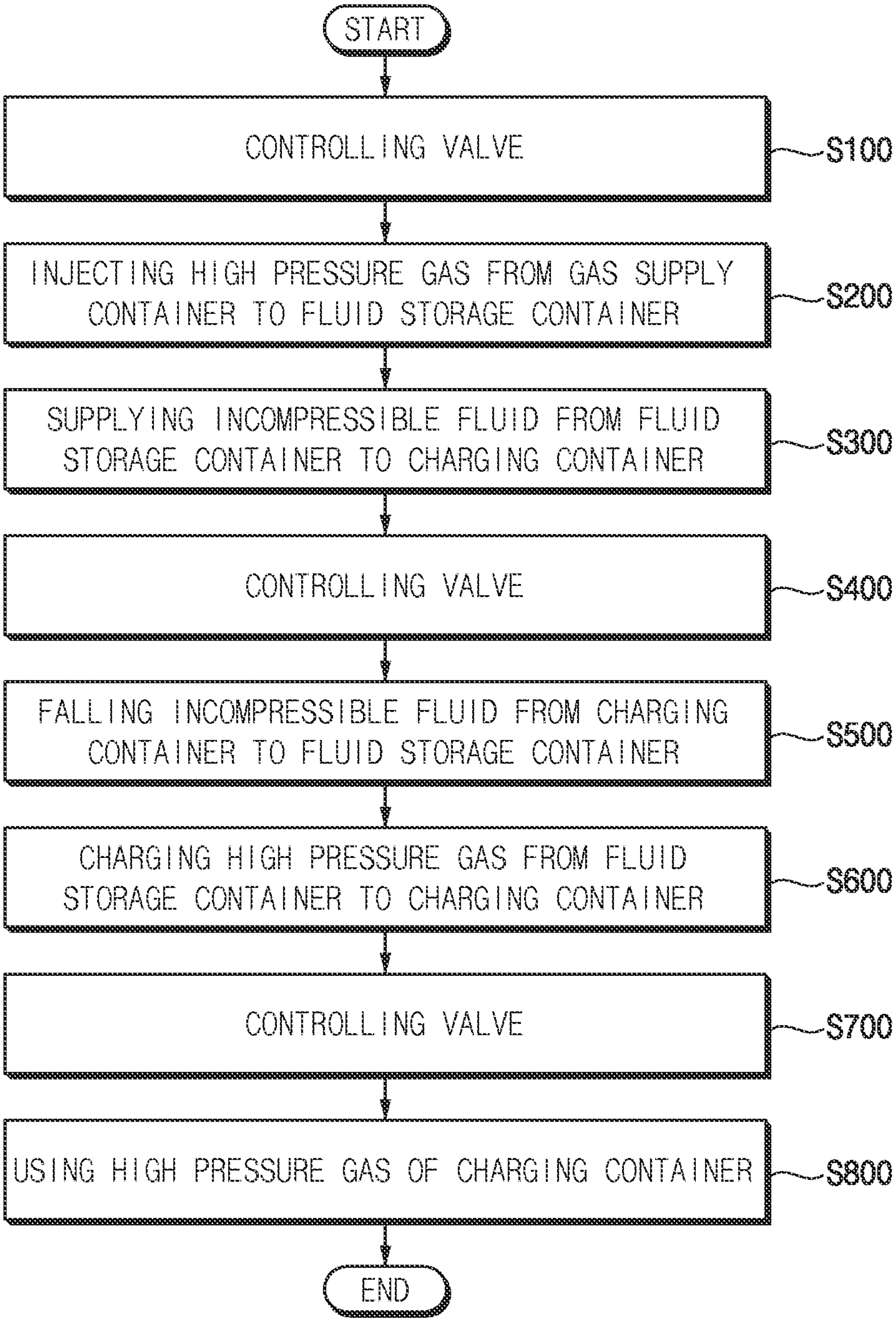
FIG. 8 is a flow chart illustrating a high pressure gas charging method using the high pressure gas charging system of FIG. 7.

FIG. 8 is a flow chart illustrating a high pressure gas charging method using the high pressure gas charging system of FIG. 7. FIG. 9A, FIG. 9B, FIG. 9C and FIG. 9D are schematic views illustrating the steps of the high pressure gas charging method of FIG. 8.

First, as explained above, at the initial state, the high pressure gas 405 is charged and stored in the inner space 1201 of the gas supply container 1200, and the incompressible fluid 305 is stored in the inner space 1301 of the fluid storage container 1300.

For example, the charging container 1400 may be assumed as a fuel tank which is equipped at the mobility and stores the high pressure gas 405, and the inner pressure of the charging container 1400 may be relatively low and may be needed to be charged.

Figure 9A:
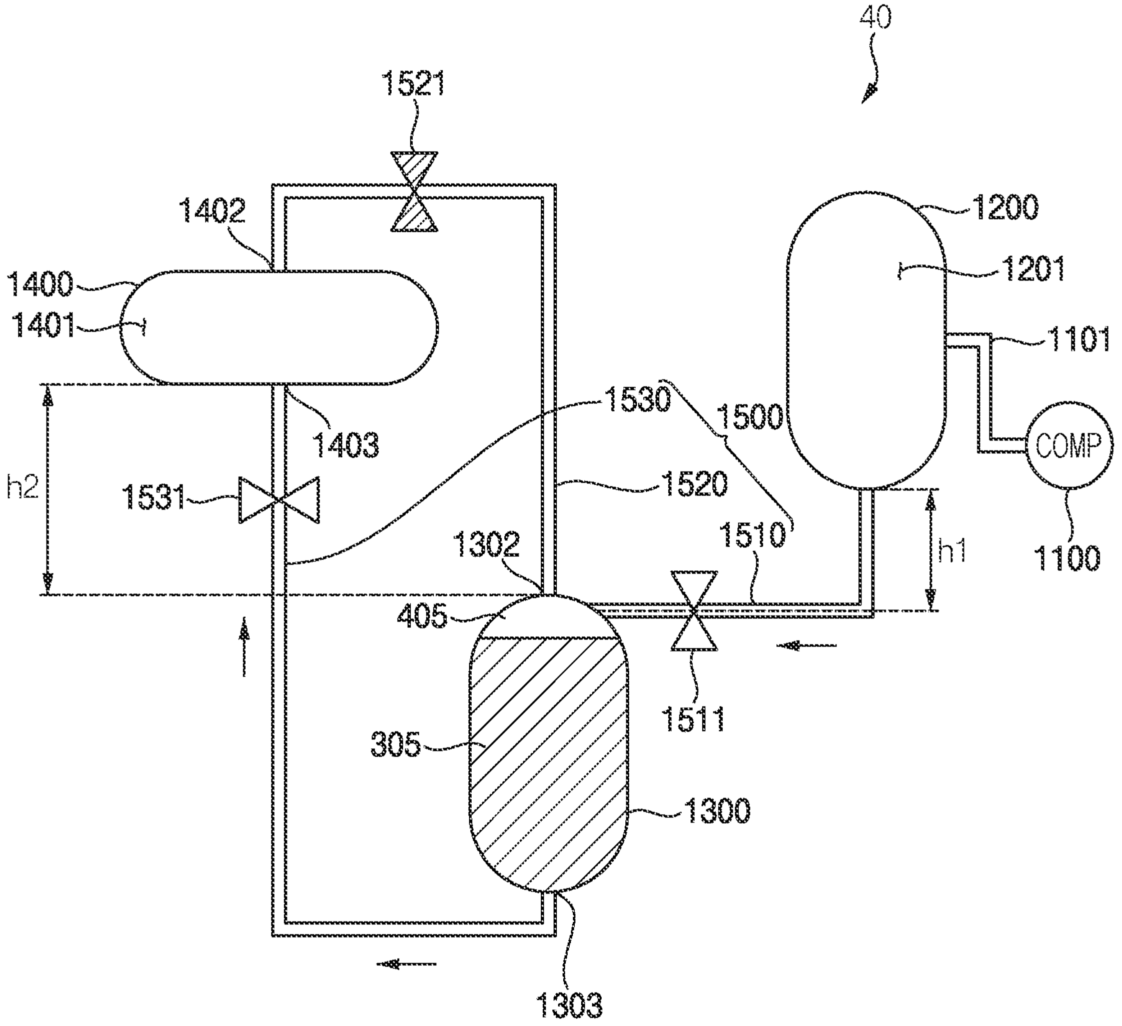
FIG. 9A, FIG. 9B, FIG. 9C and FIG. 9D are schematic views illustrating the steps of the high pressure gas charging method of FIG. 8.

Referring to FIG. 8 and FIG. 9A, in the charging method, the valve is controlled to open the first and third valves 1511 and 1531 (step S100). Here, the second valve 1521 is closed (OFF).

Then, the high pressure gas 405 stored in the gas supply container 1200 is injected to the inner space 1301 of the fluid storage container 1300 via the first valve 1510 (step S200). Here, the pressure of the high pressure gas 405 is increased due to the compressor 1100, and thus the high pressure gas 405 is naturally injected to the fluid storage container 1300 due to the opening of the first valve 1511.

Figure 9B:
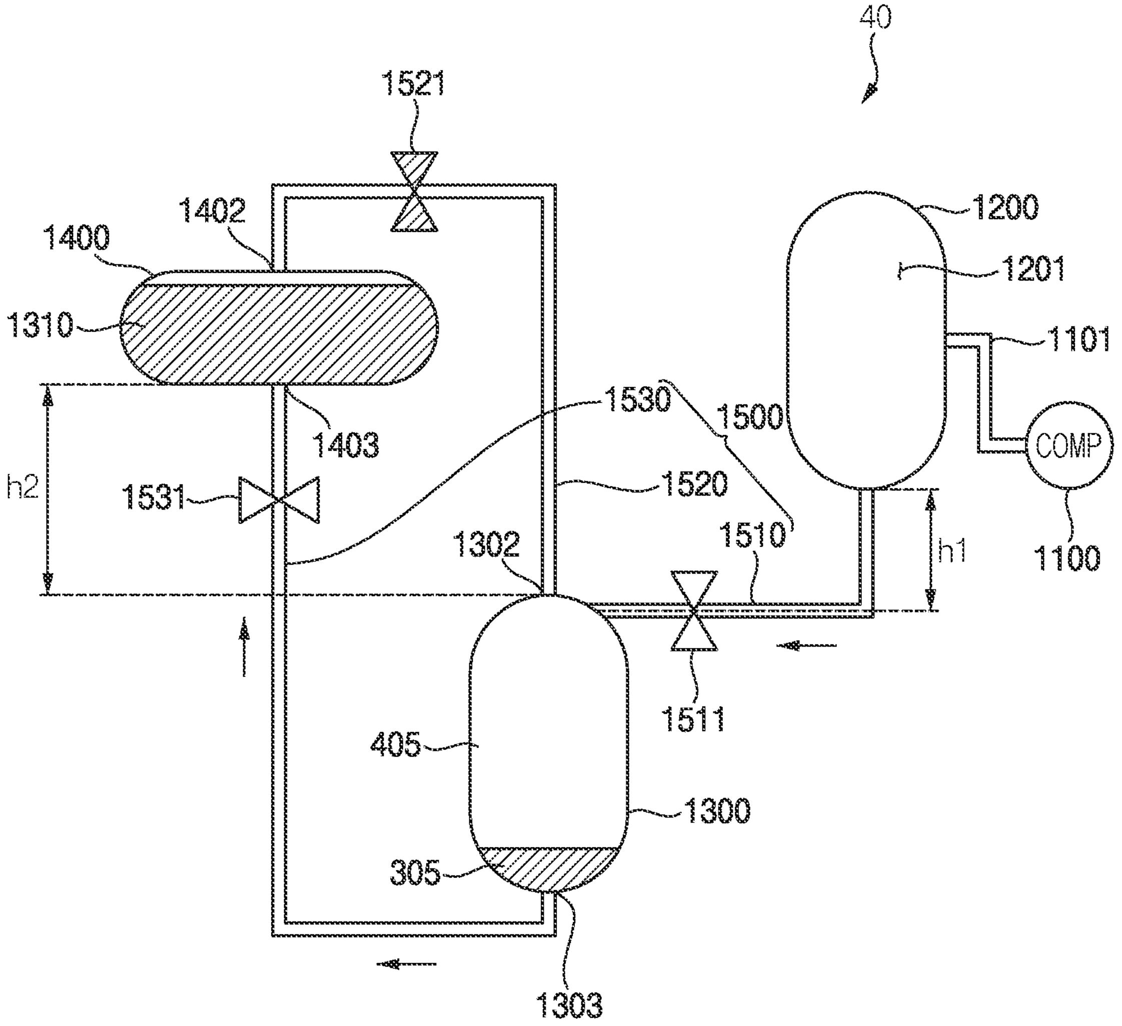

Referring to FIG. 8, FIG. 9A and FIG. 9B, as the high pressure gas 405 is injected to the fluid storage container 1300 via the first pipe 1510, the incompressible fluid 305 stored in the fluid storage container 1300 is supplied to the charging container 1400 via the third pipe 1530 (step S300).

The incompressible fluid 305 stored in the fluid storage container 1300 is pushed out by the pressure due to the injection of the high pressure gas 405, and since the second valve 1521 is closed, the incompressible fluid 305 is supplied to the charging container 1400 through the first valve 1531 which is open as in FIG. 9B.

This step is performed until the amount of the incompressible fluid 305 desired by the user is injected to the charging container 1400.

Here, the pressure of the gas same as the high pressure gas 405 remaining in the charging container 1400 is increased, and the pressure of the gas may be controlled not to be over the charging pressure of the charging container 1400.

As explained above, as the high pressure gas 405 is injected to the fluid storage container 1300, the temperature of the fluid storage container 1300 may be increased due to the compression of the gas, but the temperature control device 1310 may control or block the increase of the temperature.

Figure 9C:
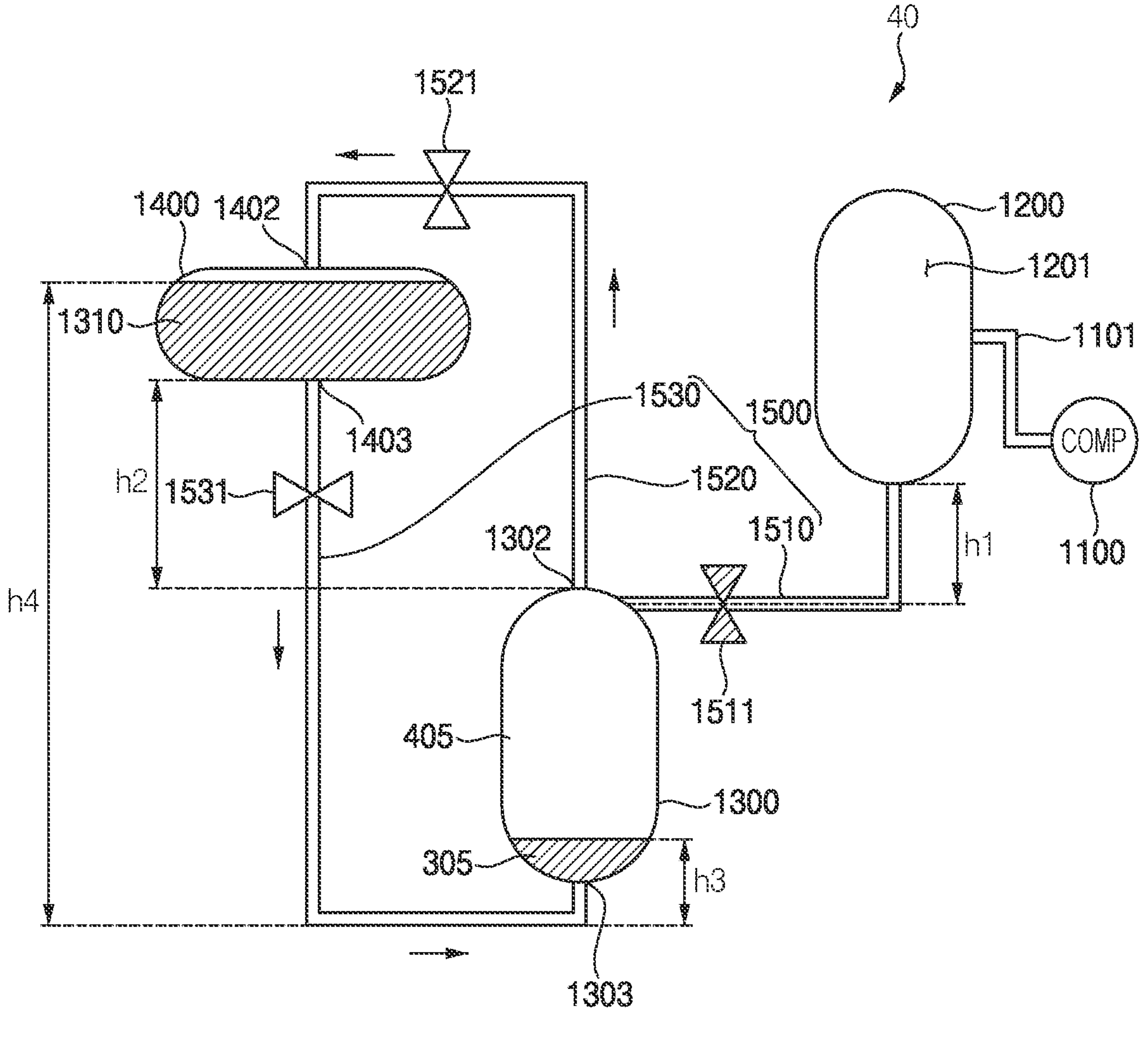

Then, referring to FIG. 8 and FIG. 9C, the first valve 1511 is closed (OFF) and the second valve 1521 is open (ON) (step S400).

Accordingly, when the first valve 1511 is closed, the high pressure gas 405 is not supplied to the fluid storage container 1300, and the flow is performed only between the fluid storage container 1300 and the charging container 1400.

In addition, since the second valve 1521 and the third valve 1531 disposed between the fluid storage container 1300 and the charging container 1400 are open (ON), the pressure applied inside of the fluid storage container 1300 and the pressure applied inside of the charging container 1400 are substantially same with each other, except for the hydrostatic pressure generated by gravity.

As explained above, since the charging container 1400 is located higher than the fluid storage container 1300 by the second height h2, the hydrostatic pressure 1 generated by the incompressible fluid 305 stored in the charging container 1400 is always larger than the hydrostatic pressure 2 generated by the incompressible fluid 305 remaining inside of the fluid storage container 1300.

As in FIG. 9C, the hydrostatic pressure 1 at the lowest position of the third pipe 1530 is defined as ρ*g*h4, and the hydrostatic pressure 2 is defined as ρ*g*h3. Here, h4>h3 and thus the hydrostatic pressure 1 is always larger than the hydrostatic pressure 2. Here, ρ is a density of the incompressible fluid and g is an acceleration of gravity.

Thus, as illustrated in FIG. 8 and FIG. 9C, the incompressible fluid 305 pushed to the charging container 1400 due to the supply of the high pressure gas 405, is supplied to the fluid storage container 1300 again, via the third pipe 1530 due to the hydrostatic pressure generated by gravity (step S500).

Here, the second height h2 may be properly designed to ensure sufficient difference in the hydrostatic pressure generated by gravity applied to the incompressible fluid 305.

Accordingly, without an additional unit such as a driving unit or a pressure applying unit, the incompressible fluid 305 may be supplied to the fluid storage container 1300 again due to the hydrostatic pressure generated by gravity.

At the same time, referring to FIG. 8 and FIG. 9C, the high pressure gas 405 stored in the fluid storage container 1300 flows outwardly as the incompressible fluid 305 is supplied to the fluid storage container 1300 again. Here, since the second valve 1521 is open, the high pressure gas 405 is supplied to the charging container 1400 via the second pipe 1520 (step S600).

Thus, the high pressure gas 405 stored in the fluid storage container 1300 is naturally charged into the charging container 1400.

If necessary, when the high pressure gas 405 stored in the fluid storage container 1300 is charged into the charging container 1400, the temperature control device 1320 additionally installed to the second pipe 1520 may control the temperature of the high pressure gas 405.

Accordingly, in the charging container 1400, with the incompressible fluid 305 filled firstly, the high pressure gas 405 is charged as much as the discharged amount of the incompressible fluid 305.

Thus, in the conventional technology, the problem of the increase of the inner temperature of the charging container is solved. Here, the temperature increases because the work performed by the high pressure gas is converted into the heat as the high pressure gas is only charged to the charging container. Since the high pressure gas performs the work pushing out the incompressible fluid in the charging container, the work performed by the high pressure gas is not converted into the heat and then the temperature of the charging container is maintained.

Thus, since the change of the temperature of the charging container 1400 is minimized and the high pressure gas 405 is charged to the charging container 1400, the charging may be performed more stably and effectively.

Figure 9D:
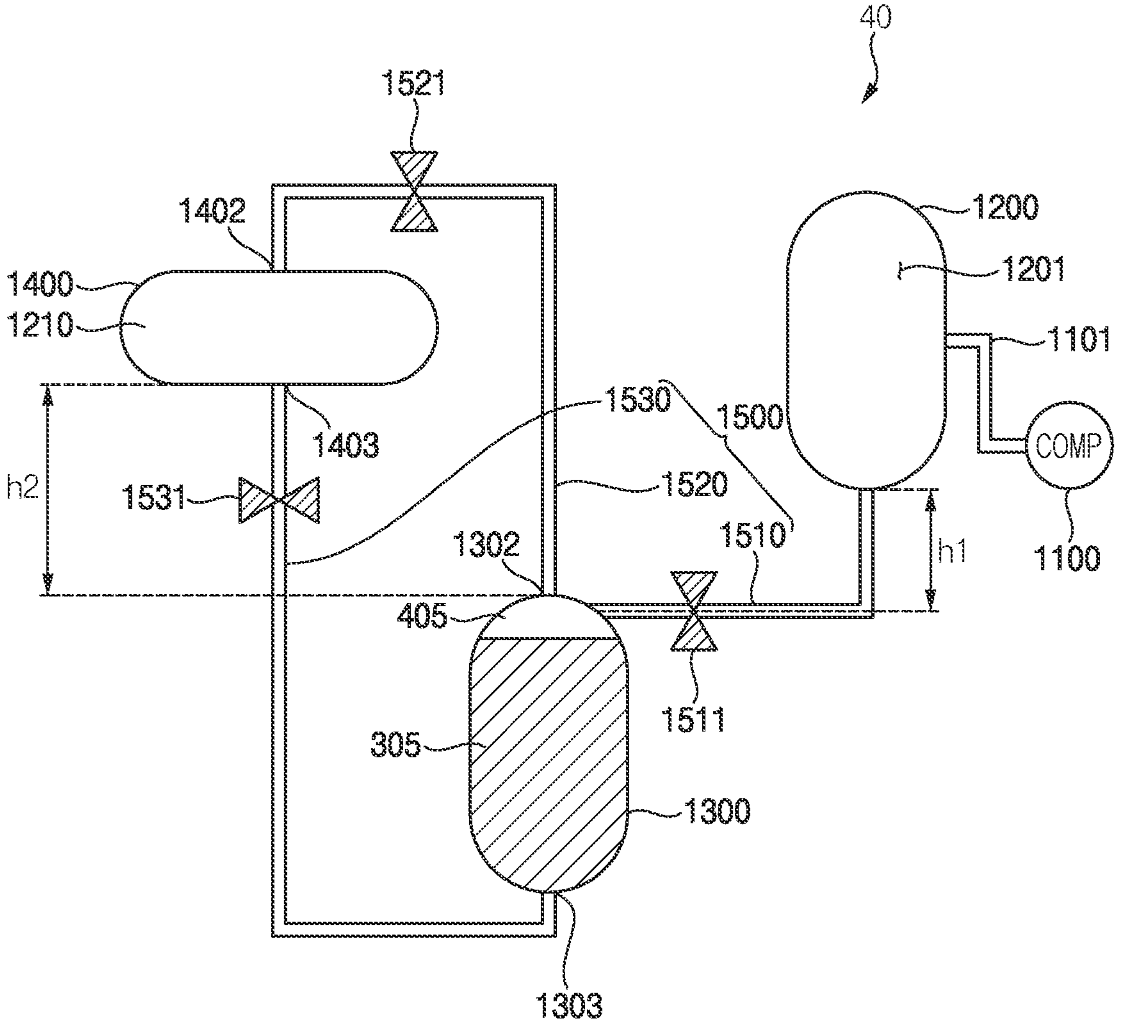

When the high pressure gas 405 is fully charged to the charging container 1400, as illustrated in FIG. 8 and FIG. 9D, the second and third valves 1521 and 1531 are controlled to be closed (OFF) (step S700).

Then, the charging container 1400 is detached from the charging system 40, and may be used for the mobility (step S800).

Alternatively, the charging container 1400 is not detached from the charging system 40, and the mobility may be directly connected to the charging container 1400 and then the high pressure gas is consumed.

For the convenience of usage, the charging container 1400 is designed to be detached from the charging system 40.

FIG. 10A is an example of a usage state of the high pressure gas in the charging container and FIG. 10B is another example of a usage state of the high pressure gas in the charging container, in the high pressure gas charging method of FIG. 8.

As illustrated in FIG. 10A, the charging container 1400 may be detached from the charging system 40 together with a part of the second pipe 1520 and a part of the third pipe 1530. Thus, although not shown in the figure, the second and third pipes 1520 and 1530 may be directly connected to the external mobility or may be connected to a device using the high pressure gas.

Further, the charging container 1400 itself may be the charging container equipped inside of the external mobility. Here, the charging container 1400 is not detached and the charging container 1400 itself is equipped to the mobility and the charging is performed by connecting the pipes to the charging container 1400.

Here, as illustrated in FIG. 10B, the second and third pipes 1525 and 1535 connected to the charging container 1400 may be disposed adjacent to the side of the charging container 1400 not to the upper portion or the lower portion of the charging container 1400.

Thus, the charging container 1400 may be detached from the charging system 40 together with the part of the second pipe 1525 and the part of the third pipe 1535.

Accordingly, when the second and third pipes 1525 and 1535 connected to the side of the charging container 1400 are entirely detached, convenience may be improved when directly connected to the mobility.

Particularly, as illustrated in the figure, a charging terminal 1600 extended from the mobility has the shape that combines the fluid supply part 300 with the high pressure charging part 400, first and second charging pipes 1610 and 1620 formed at a first side of the charging terminal 1600 may be respectively connected to the second and third pipes 1525 and 1535 more easily.

When the charging container 1400 is detached from the charging system 40 and the high pressure gas inside of the charging container 1400 is fully used, the charging container 1400 may be connected to the charging system 40 again, and the high pressure gas may be recharged as explained above.

According to the present example embodiments, the incompressible fluid is proactively provided to the charging container, and then when a pressure of the remaining space of the charging container is maintained to be a predetermined pressure suitable for charging the high pressure gas, the high pressure gas starts to be charged in the charging container. Further, since the incompressible fluid charged in the charging container is removed to outside with charging the high pressure gas, an inner pressure of the charging container is maintained with the predetermined pressure in charging the high pressure gas.

In addition, the inner pressure of the charging container is uniformly maintained until the high pressure gas is fully charged and the incompressible fluid is sufficiently removed to outside.

Accordingly, the inner pressure of the charging container is maintained to be the predetermined pressure suitable for charging the high pressure gas, and thus the compression of the high pressure gas does not occur during charging the high pressure gas and a separate high pressure gas cooling device for preventing an increase of temperature inside of the charging container may be omitted.

Here, the pressure of the charging container is not changed, the temperature of the charged high pressure gas is maintained to be a required temperature. In addition, the temperature of the incompressible fluid is maintained to be same as or less than that of the high pressure gas, and thus separate cooling device or temperature controller for cooling or controlling the temperature of the high pressure gas is needless and the temperature of the charging container may be maintained relatively lower.

Further, decreasing the temperatures of the high pressure gas and the incompressible fluid may also decrease the supplying pressure of the high pressure gas.

Here, when the incompressible fluid is selected not to affect durability of the device using the high pressure gas, the remaining incompressible fluid supplied to a mobility using the high pressure gas as a fuel does not cause any problem or trouble to the mobility, even though the incompressible fluid remains with the high pressure gas in the charging container. Thus, there is no design difficulty in completely removing the incompressible fluid.

In addition, the fluid separator is equipped to prevent the incompressible fluid from being mixed, and thus the problem caused due to the mixture between the incompressible fluid and the high pressure gas may be prevented.

In addition, in charging the high pressure gas to the charging container, the pressure of the high pressure gas is increased by the compressor and then the high pressure gas is only supplied to the fluid storage container in which the incompressible fluid is stored, so that a separate incompressible fluid supply device may be omitted and the charging may be easily and simply performed.

Here, through merely the pip configuration of the high pressure gas charging system and ON/OFF control of the valve, the separate incompressible fluid supply device may be omitted and the incompressible fluid may be easily injected to and removed from the charging container, and thus hydrogen gas as the high pressure gas may be effectively charged to the charging container.

When charging the high pressure gas into the charging container directly, the temperature of the charging container is increased due to the heat generated during the charging. However, the incompressible fluid is previously supplied to the charging container and then the high pressure gas is charged with removing the incompressible fluid, and then the heat generated in the charging container during the charging may be minimized and more effective and stable charging of the high pressure gas may be performed.

Here, the incompressible fluid is removed to outside by the hydrostatic pressure generated by gravity, without using a separate pressurizing device, and thus stable charging and improved charging speed may be achieved while minimizing separate equipment.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A high pressure gas charging system comprising:
   - a charging container in which a high pressure gas is charged;
   - a fluid supply part connected to a first side of the charging container, and configured to supply incompressible fluid into the charging container before charging the high pressure gas;
   - a high pressure charging part connected to a second side of the charging container, and configured to charge the high pressure gas into the charging container in which the incompressible fluid is already supplied; and
   - a temperature sensor configured to measure a temperature of the incompressible fluid and a temperature of the high pressure gas,
   - wherein the incompressible fluid is supplied to the charging container until an inner pressure of the charging container reaches a predetermined pressure, and the incompressible fluid is removed to outside through the fluid supply part as the high pressure gas is charged into the charging container, and
   - wherein the temperature of the incompressible fluid in the charging container maintains same as or less than the temperature of the high pressure gas charged into the charging container.

2. The system of claim 1, wherein a pressure of the high pressure gas charged into the charging container and a pressure of the incompressible fluid remaining in the charging container maintain the predetermined pressure, as the high pressure gas is charged into the charging container.

3. The system of claim 1, wherein the fluid supply part comprises:
   - an outer supply line through which the incompressible fluid is received from outside; and
   - an inner supply line connected to the outer supply line and extending toward a lower space of the charging container,
   - wherein an end portion of the inner supply line extends to make contact with a lower portion of the charging container or extends towards a lower portion of the charging container.

4. The system of claim 3, wherein the charging container is inclined with respect to a ground by a predetermined angle, and the inner supply line extends towards the lower portion of the inclined charging container.

5. The system of claim 1, wherein the high pressure gas charging part comprises:
   - an outer charging line through which the high pressure gas is received from outside; and
   - an upper supply line connected to the outer charging line and extends toward an upper space of the charging container.

6. The system of claim 1, wherein the high pressure gas charging part supplies the high pressure gas charged in the charging container to outside by controlling a valve,
   - wherein the high pressure gas charging part comprises a fluid separator configured to remove the incompressible fluid included in the high pressure gas.

7. A high pressure gas charging method comprising:
   - supplying incompressible fluid into a charging container through a fluid supply part connected to a first side of the charging container;
   - deciding whether a pressure of the charging container reaches a predetermined pressure; and
   - charging a high pressure gas into the charging container through a high pressure gas charging part connected to a second side of the charging container when the pressure of the charging container reaches the predetermined pressure, and removing the incompressible fluid to outside through the fluid supply part as the high pressure gas is charged into the charging container,
   - wherein the high pressure gas is charged and the incompressible fluid is removed until the high pressure gas is fully charged into the charging container, and
   - wherein the method further comprises: measuring, by a temperature sensor, a temperature of the incompressible fluid and a temperature of the high pressure gas, and the temperature of the incompressible fluid in the charging container maintains same as or less than the temperature of the high pressure gas charged into the charging container.

8. The method of claim 7, wherein in the charging the high pressure gas and removing the incompressible fluid,
   - a pressure of the high pressure gas charged in the charging container and a pressure of the incompressible fluid remaining in the charging container maintain the predetermined pressure.

9. A high pressure gas charging system comprising:
   - a gas supply container configured to store a high pressure gas;
   - a fluid storage container connected to the gas supply container and configured to store incompressible fluid; and
   - a charging container connected to each of an upper portion and a lower portion of the fluid storage container, wherein the high pressure gas is charged into the charging container,
   - wherein the incompressible fluid stored in the fluid storage container is supplied to the charging container as the high pressure gas stored in the gas supply container is supplied to the fluid storage container,
   - wherein the high pressure gas in the fluid storage container is charged into the charging container as the incompressible fluid supplied to the charging container is supplied back to the fluid storage container, wherein the charging container is positioned higher than the fluid storage container such that a hydrostatic pressure is generated by gravity due to a height difference between the charging container and the fluid storage container, and wherein the incompressible fluid supplied to the charging container is supplied back to the fluid storage container due to the hydrostatic pressure generated by gravity.

10. The system of claim 9, wherein a temperature of the high pressure gas supplied to the fluid storage container and a temperature of the incompressible fluid supplied to the fluid storage container maintain a predetermined temperature.

11. The system of claim 9, further comprises:
   - a first pipe connected between the gas supply container and the fluid storage container, and having a first valve;

a second pipe connected between an upper portion of the fluid storage container and the charging container, and having a second valve; and a third pipe connected between a lower portion of the fluid storage container and the charging container, and having a third valve.

12. The system of claim 11, wherein with the first valve and the third valve open (ON) and the second valve closed (OFF), the high pressure gas stored in the gas supply container is supplied to the fluid storage container through the first pipe, and the incompressible fluid stored in the fluid storage container is supplied to the charging container through the third pipe.

13. The system of claim 11, wherein with the first valve closed (OFF) and the second valve and the third valve open (ON), the incompressible fluid supplied to the charging container is supplied back to the fluid storage container through the third pipe, and the high pressure gas in the fluid storage container is charged into the charging container through the second pipe.

14. The system of claim 9, wherein the charging container in which the high pressure gas is charged is built in an external mobility, is detached and equipped in the external mobility, or is connected to a charging terminal extended from the external mobility.

15. A high pressure gas charging method comprising:

injecting a high pressure gas to a fluid storage container from a gas supply container;

supplying incompressible fluid stored in the fluid storage container to a charging container, as the high pressure gas is injected to the fluid storage container;

supplying the incompressible fluid back to the fluid storage container from the charging container, when the high pressure gas is fully injected to the fluid storage container; and charging the high pressure gas injected to the fluid storage container to the charging container, as the incompressible fluid is supplied to the fluid storage container, wherein the charging container is positioned higher than the fluid storage container such that a hydrostatic pressure is generated by gravity due to a height difference between the charging container and the fluid storage container, and wherein the incompressible fluid in the charging container is supplied to the fluid storage container due to the hydrostatic pressure generated by gravity.

16. The method of claim 15, wherein in the injecting the high pressure gas to the fluid storage container, a first valve connected between the gas supply container and the fluid storage container is open and a pressure of the high pressure gas is increased by a compressor, and then the high pressure gas stored in the gas supply container is supplied to the fluid storage container, wherein in the supplying the incompressible fluid stored in the fluid storage container to the charging container, a second valve connected between an upper portion of the fluid storage container and an upper portion of the charging container is closed and a third valve connected between a lower portion of the fluid storage container and a lower portion of the charging container is open, and then the incompressible fluid is supplied to the charging container due to a pressure generated by the high pressure gas toward the fluid storage container, wherein in the supplying the incompressible fluid back to the fluid storage container and charging the high pressure gas to the charging container, the first valve is closed and the second valve is open, and then the incompressible fluid is filled to the fluid storage container from a lower portion of the charging container through a lower portion of the fluid storage container, and thus the high pressure gas is charged to the charging container from an upper portion of the fluid storage container through an upper portion of the charging container.

* * * * *